US012388999B2

(12) United States Patent
Zhang et al.

(10) Patent No.: US 12,388,999 B2
(45) Date of Patent: Aug. 12, 2025

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Honglei Zhang, Tampere (FI); Francesco Cricrì, Tampere (FI); Hamed Rezazadegan Tavakoli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 114 days.

(21) Appl. No.: 18/557,196

(22) PCT Filed: Feb. 9, 2022

(86) PCT No.: PCT/FI2022/050080
§ 371 (c)(1),
(2) Date: Oct. 25, 2023

(87) PCT Pub. No.: WO2022/229495
PCT Pub. Date: Nov. 3, 2022

(65) Prior Publication Data
US 2024/0223762 A1    Jul. 4, 2024

(30) Foreign Application Priority Data

Apr. 30, 2021  (FI) .................................... 20215510

(51) Int. Cl.
*H04N 19/124* (2014.01)
*H04N 19/132* (2014.01)

(52) U.S. Cl.
CPC ......... *H04N 19/124* (2014.11); *H04N 19/132* (2014.11)

(58) Field of Classification Search
CPC ....... H04N 19/625; G06N 3/088; G06N 20/00
See application file for complete search history.

(56) References Cited

U.S. PATENT DOCUMENTS

2018/0366135 A1*  12/2018  Nakatani ............. G10L 21/0308
2020/0160565 A1*   5/2020  Ma ........................ H04N 19/60
2020/0372684 A1*  11/2020  Wen ..................... H04N 19/136

FOREIGN PATENT DOCUMENTS

WO      2021/255567 A1    12/2021

OTHER PUBLICATIONS

Minnen et al. "Image-Dependent Local Entropy Models for Learned Image Compression," 2018 25th IEEE International Conference on Image Processing (ICIP), Athens, Greece, 2018, pp. 430-434, doi: 10.1109/ICIP.2018.8451502. (Year: 2018).*

(Continued)

*Primary Examiner* — Fabio S Lima
(74) *Attorney, Agent, or Firm* — Nokia Technologies Oy

(57) ABSTRACT

The embodiments relate to an apparatus and a method for encoding and decoding. The encoding method comprises receiving (805) visual data; converting (810) the visual data into a latent representation comprising channels; quantizing (815) the latent representation; processing (820) the channels of the quantized latent representation (x) according to a predefined channel dependency mode by generating (825) a mixed representation (y) comprising predicted values and original values from the quantized latent representation; generating (830) a mask representation (m) indicating which elements in the mixed representation are with original values; estimating (750, 835) parameters (q) for a probability distribution function or a probability distribution of elements with the predicted values; encoding (840) elements with the predicted values using the original values from the quantized latent representation and the estimated probability distribution function for these elements into a bitstream; updating (710, 720, 845) a mixed representation (y) with the original values from the quantized latent representation (x)

(Continued)

and the mask representation (m) accordingly; repeating (850) the processing for all elements.

20 Claims, 8 Drawing Sheets

(56) References Cited

OTHER PUBLICATIONS

"Video Coding for Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.

"High Efficiency Video Coding", Series H: Audiovisual and Multimedia Systems, Infrastructure of audiovisual services—Coding of moving video, Recommendation ITU-T H.265, Feb. 2018, 692 pages.

"Versatile Video Coding", Series H: Audiovisual and Multimedia Systems Infrastructure of audiovisual services—Coding of moving video, Recommendation ITU-T H.266, Aug. 2020, 516 pages.

"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.

Ballé et al., "Variational Image Compression with a Scale Hyperprior", arXiv, May 1, 2018, pp. 1-23.

Minnen et al., "Joint Autoregressive and Hierarchical Priors for Learned Image Compression", arXiv, Sep. 8, 2018, pp. 1-22.

Zhang et al., "Lossless Image Compression Using a Multi-Scale Progressive Statistical Model", Proceedings of the Asian Conference on Computer Vision (ACCV), 2020, pp. 1-14.

Ma et al., "A Cross Channel Context Model for Latents in Deep Image Compression", arXiv, Mar. 4, 2021, pp. 1-13.

Salimans et al., "PixelCNN++: Improving the PixelCNN with Discretized Logistic Mixture Likelihood and Other Modifications", International Conference on Learning Representations (ICLR), 2017, pp. 1-10.

Office action received for corresponding Finnish Patent Application No. 20215510, dated Oct. 26, 2021, 12 pages.

Lee et al., "Context-adaptive Entropy Model for End-to-end Optimized Image Compression", arXiv, May 6, 2019, pp. 1-20.

Pessoa et al., "End-to-End Learning of Video Compression Using Spatio-Temporal Autoencoders", IEEE Workshop on Signal Processing Systems (SiPS), Oct. 20-22, 2020, 6 pages.

Guo et al., "Accelerate Neural Image Compression with Channel-adaptive Arithmetic Coding", IEEE International Symposium on Circuits and Systems (ISCAS), May 22-28, 2021, 5 pages.

International Search Report and Written Opinion received for corresponding Patent Cooperation Treaty Application No. PCT/FI2022/050080, dated May 5, 2022, 20 pages.

Zou et al., "End-to-End Learning for Video Frame Compression with Self-Attention", arXiv, Apr. 20, 2020, 5 pages.

\* cited by examiner

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/FI2022/050080, filed on Feb. 9, 2022, which claims priority from FI Application No. 20215510, filed on Apr. 30, 2021, each of which is incorporated herein by reference in its entirety.

TECHNICAL FIELD

The present solution generally relates to neural networks.

BACKGROUND

It is known to compress data to consume less space and to facilitate transmission.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus for encoding, the apparatus comprising means for receiving a visual data; means for converting the visual data into a latent representation comprising channels; means for quantizing the latent representation into a quantized latent representation if required; means for processing the channels of the quantized latent representation according to a predefined channel dependency mode by
  generating a mixed representation comprising predicted values and original values from the quantized latent representation;
  generating a mask representation indicating which elements in the mixed representation are with original values;
  based on the mask representation and the mixed representation, estimating parameters for a probability distribution function or a probability distribution of elements with the predicted values;
  encoding elements with the predicted values using original values from the quantized latent representation and the estimated probability distribution function for these elements into a bitstream;
  updating a mixed representation with the original values from the quantized latent representation and the mask representation accordingly;
  repeating the processing for all elements in the quantized latent representation.

According to a second aspect, there is provided a method for encoding, comprising receiving a visual data; converting the visual data into a latent representation comprising channels; quantizing the latent representation into a quantized latent representation if required; processing the channels of the quantized latent representation according to a predefined channel dependency mode by
  generating a mixed representation comprising predicted values and original values from the quantized latent representation;
  generating a mask representation indicating which elements in the mixed representation are with original values;
  based on the mask representation and the mixed representation, estimating parameters for a probability distribution function or a probability distribution of elements with the predicted values;
  encoding elements with the predicted values using the original values from the quantized latent representation and the estimated probability distribution function for these elements into a bitstream;
  updating a mixed representation with the original values from the quantized latent representation and the mask representation accordingly;
  repeating the processing for all elements in the quantized latent representation.

According to a third aspect, there is provided an apparatus comprising at least one processor, memory including computer program code, the memory and the computer program code configured to, with the at least one processor, cause the apparatus to perform at least the following: receive a visual data; convert the visual data into a latent representation comprising channels; quantize the latent representation into a quantized latent representation if required; process the channels of the quantized latent representation according to a predefined channel dependency mode by
  generate a mixed representation comprising predicted values and original values from the quantized latent representation;
  generate a mask representation indicating which elements in the mixed representation are with original values;
  based on the mask representation and the mixed representation, estimate parameters for a probability distribution function or a probability distribution of elements with the predicted values;
  encode elements with the predicted values using the original values from the quantized latent representation and the estimated probability distribution function for these elements into a bitstream;
  update a mixed representation with the original values from the quantized latent representation and the mask representation accordingly.

According to a fourth aspect, there is provided an apparatus for decoding, comprising means for receiving an encoded bitstream; means for decoding a quantized latent representation comprising channels from the bitstream; means for processing the channels of the quantized latent representation by
  generating a mixed representation comprising predicted values;
  generating a mask representation indicating position of the elements to be processed according to a predefined channel dependency mode;
  based on the mask representation and the mixed representation, means for estimating parameters for a probability distribution function or a probability distribution of elements to be processed;
  means for decoding elements in the quantized latent representation by using the estimated parameters;
  means for updating a mixed representation with decoded elements in corresponding locations;

means for updating a mask representation with the locations of the elements that have been decoded;
means for repeating until all elements in the quantized latent representation are decoded;
means for dequantizing the quantized latent representation to result in a latent representation; and means for recovering the visual data by means of the latent representation.

According to a fifth aspect, there is provided a method for decoding, comprising receiving an encoded bitstream; decoding a quantized latent representation comprising channels from the bitstream; processing the channels of the quantized latent representation by
generating a mixed representation comprising predicted values;
generating a mask representation indicating position of the elements to be processed according to a predefined channel dependency mode;
based on the mask representation and the mixed representation, estimating parameters for a probability distribution function or a probability distribution of elements to be processed;
decoding elements in the quantized latent representation by using the estimated parameters;
updating a mixed representation with decoded elements in corresponding locations;
updating a mask representation with the locations of the elements that have been decoded;
repeating until all elements in the quantized latent representation are decoded;
dequantizing the quantized latent representation to result in a latent representation; and recovering the visual data by means of the latent representation.

According to a sixth aspect, there is provided an apparatus comprising at least one processor, memory including computer program code, the memory and the computer program code configured to, with the at least one processor, cause the apparatus to perform at least the following receive an encoded bitstream; decode a quantized latent representation comprising channels from the bitstream; process the channels of the quantized latent representation by
generate a mixed representation comprising predicted values;
generate a mask representation indicating position of the elements to be processed according to a predefined channel dependency mode;
based on the mask representation and the mixed representation, estimate parameters for a probability distribution function or a probability distribution of elements to be processed;
decode elements in the quantized latent representation by using the estimated parameters;
update a mixed representation with decoded elements in corresponding locations;
update a mask representation with the locations of the elements that have been decoded;
repeat until all elements in the quantized latent representation are decoded;
dequantize the quantized latent representation to result in a latent representation; and recover the visual data by means of the latent representation.

According to a seventh aspect, there is provided a computer program product comprising computer program code configured to, when executed on at least one processor, cause an apparatus or a system to: receive a visual data; convert the visual data into a latent representation comprising channels; quantize the latent representation into a quantized latent representation; process the channels of the quantized latent representation according to a predefined channel dependency mode by
generate a mixed representation comprising predicted values and original values from the quantized latent representation;
generate a mask representation indicating which elements in the mixed representation are with original values;
based on the mask representation and the mixed representation, estimate parameters for a probability distribution function or a probability distribution of elements comprising the predicted values;
encode elements comprising the predicted values using the original values from the quantized latent representation and the estimated probability distribution function for these elements into a bitstream;
update a mixed representation with the original values from the quantized latent representation and the mask representation accordingly.

According to an eighth aspect, there is provided a computer program product comprising computer program code configured to, when executed on at least one processor, cause an apparatus or a system to receive an encoded bitstream; decode a quantized latent representation comprising channels from the bitstream; process the channels of the quantized latent representation by
generate a mixed representation comprising predicted values;
generate a mask representation indicating position of the elements to be processed according to a predefined channel dependency mode;
based on the mask representation and the mixed representation, estimate parameters for a probability distribution function or a probability distribution of elements to be processed;
decode elements in the quantized latent representation by using the estimated parameters;
update a mixed representation with decoded elements in corresponding locations;
update a mask representation with the locations of the elements that have been decoded;
repeat until all elements in the quantized latent representation are decoded;
dequantize the quantized latent representation to result in a latent representation; and recover the visual data by means of the latent representation.

According to an embodiment, the mixed representation and the mask representation are concatenated to result in a concatenated representation.

According to an embodiment, the concatenated representation is transformed into an intermediate representation.

According to an embodiment, the parameters are estimated by processing the intermediate representation in a neural network.

According to an embodiment, the quantized latent representation is a three-dimensional tensor or four-dimensional tensor.

According to an embodiment, in a first predefined channel dependency mode, the channels are split into two groups, where first group has channels being dependent on all previous channels, and where second group has channels that are independent of the channels in the second group, but depend on the channels in the first group.

According to an embodiment, in a second predefined channel dependency mode, the channels are split into a plurality of groups, where channels in each group are independent of each other, but dependent on all channels in groups that have already been processed.

According to an embodiment, in a third predefined channel dependency mode, the channels are split into a plurality of groups, where each channel in the first group is dependent on the previous channels of the first group, and where channels in other groups than the first group are independent of the channels in the same group, but depend on the channels in the groups that have been processed.

According to an embodiment, in a fourth predefined channel dependency mode, the channels are split into a plurality of groups, where channels in each group are dependent on the previous channels in the same group, and where channels in a group are independent of any channels in other groups.

According to an embodiment, in a fifth predefined channel dependency mode, the channels are split into first and second groups, wherein channels in the first group are split into a plurality of subgroups comprising channels being dependent on all previous channels and independent of any channel in other subgroups; wherein channels in the second group are split into a plurality of subgroups comprising channels being independent of channels in the same subgroup but dependent on the channels in previous subgroups and subgroups of the first group.

According to an embodiment, in a sixth predefined channel dependency mode, the channels are split into first and second groups; splitting channels of the first group into a plurality of subgroups comprising channels being dependent on all previous channels, and being independent of any channel in other subgroups; splitting channels of the second group into a plurality of subgroups comprising channels being dependent on the channels in the same subgroup and the channels in the first group, but being independent of the channels in the other subgroups of the second group.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

The present embodiments relate to video encoding/decoding, and in particular to channel dependency modes for neural network-based probability mode.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

In the specification, terms "model" and "neural network" are used interchangeably and also the term "weight" may be referred to as "learnable parameter" or as "parameter".

Figure 1:
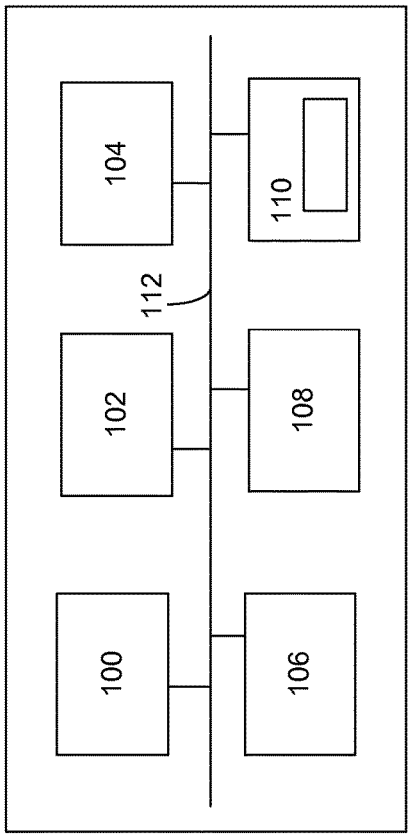
FIG. 1 shows an apparatus according to an embodiment.

FIG. 1 shows an apparatus according to present embodiments. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, a memory 102, a storage device 104, an input device 106, an output device 108, and a graphics subsystem 110, where are connected to each other via a data bus 112.

The main processing unit 100 is a processing unit arranged to process data within the data processing system. The main processing unit 100 may comprise or may be implemented as one or more processors or processor circuitry. The memory 102, the storage device 104, the input device 106, and the output device 108 may include other components as recognized by those skilled in the art. The memory 102 and storage device 104 store data in the data processing system 100. Computer program code resides in the memory 102 for implementing, for example, neural network training or other machine learning process. The input device 106 inputs data into the system while the output device 108 receives data from the data processing system and forwards the data, for example, to a display. While data bus 112 is shown as a single line, it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet table computer.

It needs to be understood that different embodiments allow different parts to be carried out in different elements. For example, various processes of the computer system may be carried out in one or more processing devices; for example, entirely in one computer device, or in one server device or across multiple user devices. The elements of machine learning process may be implemented as a software component residing on one device or distributed across several devices, as mentioned above, for example so that the devices form a so-called cloud.

A neural network (NN) is a computation graph consisting of several layers of computation. Each layer consists of one or more units, where each unit performs an elementary computation. A unit is connected to one or more other units, and the connection may have associated with a weight. The weight may be used for scaling the signal passing through the associated connection. Weights are learnable parameters, i.e., values which can be learned from training data. There may be other learnable parameters, such as those of batch-normalization layers.

Figure 2:
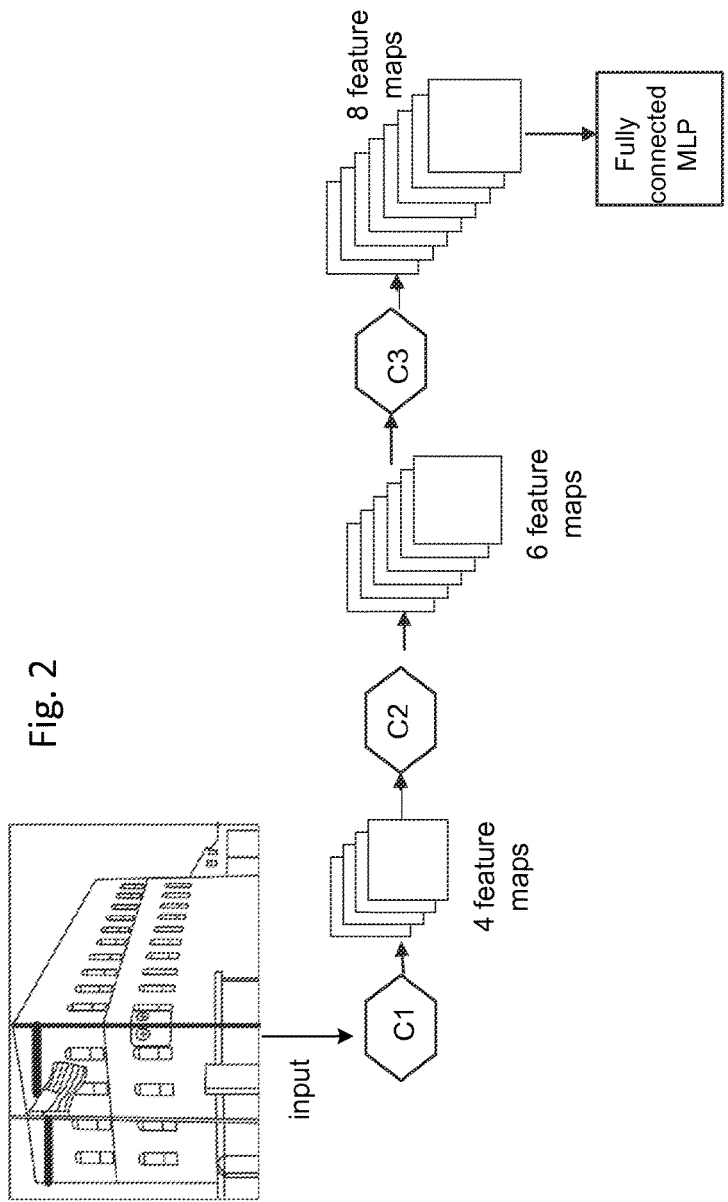
FIG. 2 shows an example of a convolutional neural network.

FIG. 2 shows an example of a neural network, a Convolutional Neural Network (CNN). This example of a CNN comprises one or more convolutional layers, fully connected layers, and a classification layer on top. CNNs are relatively easy to train compared to other deep neural networks and have fewer parameters to be estimated. Therefore, CNNs are highly attractive architecture to use, especially in image and speech applications.

In the example of FIG. 2, the input to a CNN is an image, but any other data could be used as well. Each layer of a CNN represents a certain abstraction (or semantic) level, and the CNN extracts multiple feature maps. A feature map may for example comprise a dense matrix of Real numbers representing values of the extracted features. The CNN in FIG. 2 has only three feature (or abstraction, or semantic) layers C1, C2, C3 for the sake of simplicity, but CNNs may have more than three convolution layers.

The first convolution layer C1 of the CNN may comprise extracting 4 feature-maps from the first layer (i.e. from the input image). These maps may represent low-level features found in the input image, such as edges and corners. The second convolution layer C2 of the CNN which may extract 6 feature-maps from the previous layer, increases the semantic level of the extracted features. Similarly, the third convolution layer C3 may represent more abstract concepts found in images, such as combinations of edges and corners, shapes, etc. The last layer of the CNN, referred to as fully connected Multi-Layer Perceptron (MLP) may include one or more fully connected (i.e., dense) layers and a final classification layer. The MLP uses the feature-maps from the last convolution layer in order to predict (recognize) for example the object class. For example, it may predict that the object in the image is a house.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more preceding layers, and provide output to one or more of following layers.

Initial layers (those close to the input data) extract semantically low-level features, such as edges and textures in images, and intermediate and final layers extract more high-level features. After the feature extraction layer there may be one or more layers performing a certain task, such as classification, semantic segmentation, object detection, denoising, style transfer, super-resolution, etc. In recurrent neural networks, there is a feedback loop, so that the neural network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

The most important property of neural networks (and other machine learning tools) is that they are able to learn properties from input data, either in supervised way or in unsupervised way. Such learning is a result of a training algorithm, or of a meta-level neural network providing the training signal. In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training may happen by minimizing or decreasing the output's error, also referred to as the loss. Examples of losses are mean squared error, cross-entropy, etc. In recent deep learning techniques, training is an iterative process, where at each iteration the algorithm modifies the weights of the neural network to make a gradual improvement of the network's output, i.e., to gradually decrease the loss.

Training a neural network is an optimization process, but the final goal is different from the typical goal of optimization. In optimization, the only goal is to minimize a function. In machine learning, the goal of the optimization or training process is to make the neural network learn the properties of the data distribution from a limited training dataset. In other words, the goal is to learn to use a limited training dataset in order to learn to generalize to previously unseen data, i.ee, data which was not used for training the model. This may be referred as "generalization". In practice, data may be split into at least two sets, the training set and the validation set. The training set is used for training the neural network, i.e., to modify its learnable parameters in order to minimize the loss. The validation set is used for checking the performance of the network on data, which was not used to minimize the loss, as an indication of the final performance of the neural network. In particular, the errors on the training set and on the validation set are monitored during the training process to understand the following things:

- if the network is learning at all—in this case, the training set error should decrease, otherwise the model is in the region of underfitting.
- if the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting This means that the model has just memorized the training set's properties and performs well only on that set, but performs poorly on a set not used for tuning its parameters.

Lately, neural networks have been used for compressing and de-compressing data such as image, i.e., an image codec. The most widely used architecture for realizing one component of an image codec is the auto-encoder, which is a neural network consisting of two parts: a neural encoder and a neural decoder. Neural encoder takes as input an image and produces a code which requires less bits than the input image. This code may be obtained by applying a binarization or quantization process to the output of the neural encoder. The neural decoder takes in this code and reconstructs the image which was input to the neural encoder.

Such neural encoder and neural decoder may trained to minimize a combination of bitrate and distortion, where the distortion may be based on one or more of the following metrics: Mean Squared Error (MSE), Peak Signal-to-Noise Ratio (PSNR), Structural Similarity Index Measure (SSIM), or similar. The distortion metrics may be meant to be correlated to the human visual perception, or machine consumption. Minimizing or maximizing one or more of these distortion metrics results into improving the quality of the decoded image for the consumption.

Video codec consists of an encoder that transforms the input video into a compressed representation suited for storage/transmission, and a decoder that can be decompress the compressed video representation back into a viewable form. The encoder may discard some information in the original video sequence in order to represent the video in a more compact from (that is, at lower bitrate).

Hybrid video codecs, for example ITU-T H.263 and H.264, may encode the video information in two phases. Firstly, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the predication error, i.e. the difference between the predicted block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction, the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder may reconstruct the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means, the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In video codecs, the motion information may be indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently, they may be coded differentially with respect to block specific predicted motion vectors. In video codecs, the predicted motion vectors may be created in a predefined way, for example calculating the median of the encoded and decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or or co-located blocks in temporal reference picture. Moreover, high efficiency video codecs may employ an additional motion information coding/decoding mechanism, often called merging/merge mode. In the merging mode, all the motion field information, which includes motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information is signalled among a list of motion field candidate list filled with motion field information of available adjacent/co-located blocks.

In video codecs, the prediction residual after motion compensation may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding specifications may enable the use of supplemental enhancement information (SEI) messages or alike. Some video coding specifications include SEI NAL units, and some video coding specifications contain both prefix SEI NAL units and suffix SEI NAL units, where the former type can start a picture unit or alike and the latter type can end a picture unit or alike. An SEI NAL unit contains one or more SEI messages, which are not required for the decoding of output pictures but may assist in related processes, such as picture output timing, post-processing of decoded pictures, rendering, error detection, error concealment, and resource reservation. Several SEI messages are specified in H.264/AVC, H.265/HEVC, H.266NVC, and H.274/VSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A design principle has been followed for SEI message specifications: the SEI messages are generally not extended in future amendments or versions of the standard.

Image and video codecs may use a set of filters to enhance the visual quality of the predicted visual content and can be applied either in-loop or out-of-loop, or both. In the case of in-loop filters, the filter applied on one block in the currently encoded frame will affect the encoding of another block in the same frame and/or in another frame which is predicted from the current frame. An in-loop filter can affect the bitrate and/or the visual quality. In fact, an enhanced block will cause a smaller residual (difference between original block and predicted-and-filtered block), thus requiring less bits to be encoded. An out-of-the loop filter may be applied on a frame after it has been reconstructed, the filtered visual content will not be as a source for prediction, and thus it may only impact the visual quality of the frames that are output by the decoder.

Recently, neural networks (NNs) have been used in the context of image and video compression, by following mainly two approaches.

In one approach, NNs are used to replace one or more of the components of a traditional codec such as WC/H.266. Here, "traditional" refers to those codecs whose components and their parameters are typically not learned from data. Examples of such components are:

Additional in-loop filter, for example by having the NN as an additional in-loop filter with respect to the traditional loop filters.

Single in-loop filter, for example by having the NN replacing all traditional in-loop filters.

Intra-frame prediction.

Inter-frame prediction.

Transform and/or inverse transform.

Probability model for the arithmetic codec.

Etc.

Figure 3:
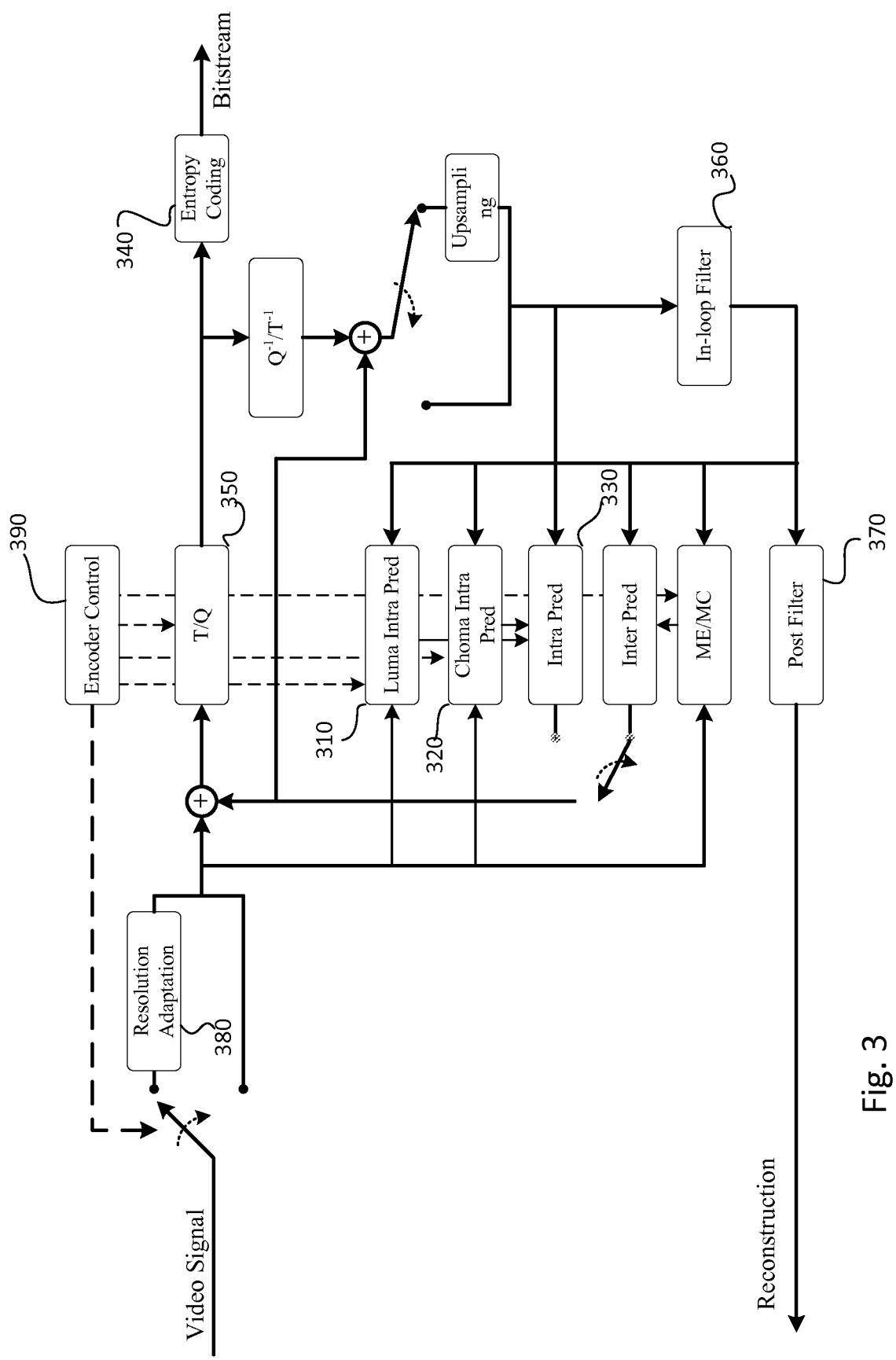
FIG. 3 shows an example of a traditional video coding pipeline.

FIG. 1 illustrates examples of how NNs can function as components of a traditional codec's pipeline. FIG. 3 shows deep intra prediction neural network 310; deep cross component prediction neural network 320; deep inter prediction neural network 330; deep probability estimation neural network 340; deep transform neural network 350; deep loop filter 360; deep post filter 370; deep up-/down-sampling coding 380; and an optional deep encoder 390.

Figure 4:
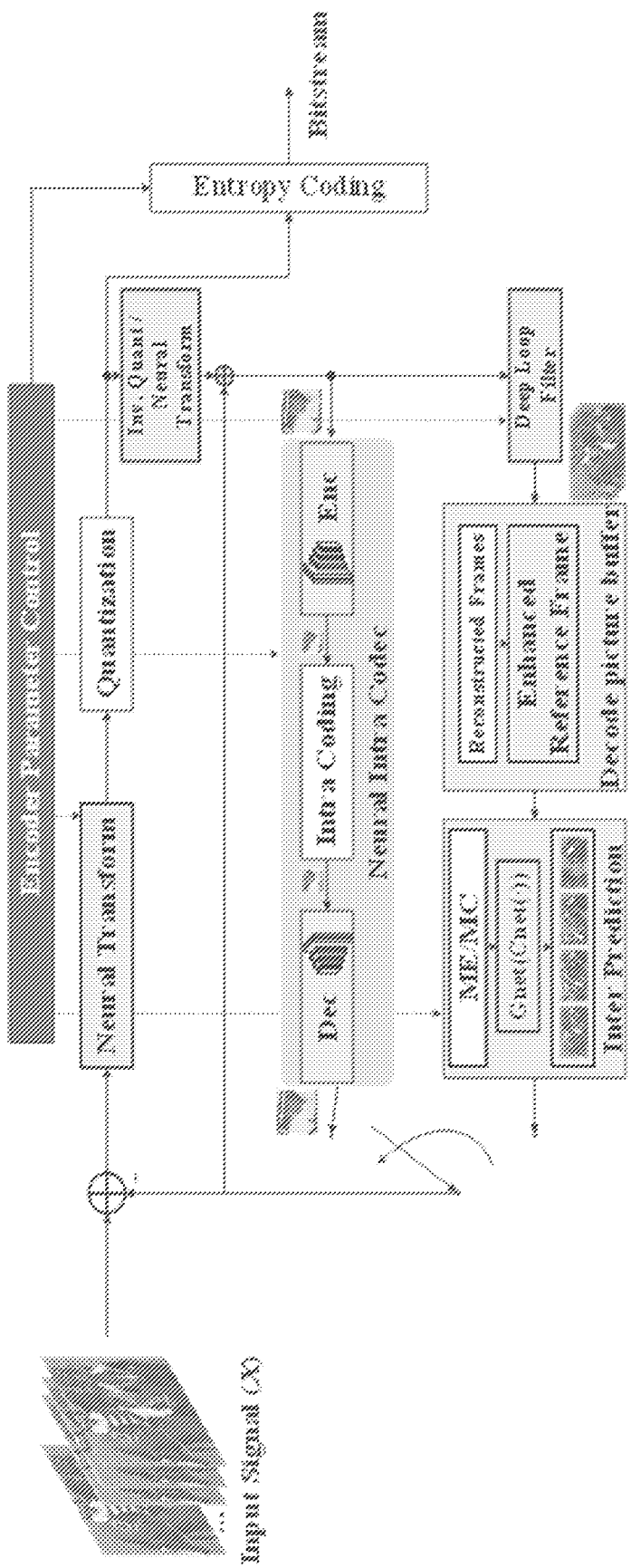
FIG. 4 shows an example of a traditional video coding pipeline with neural network-based components.

In another approach, commonly referred to as "end-to-end learned compression", NNs are used as the main components of the image/video codecs. In this second approach, there are two main options:

Option 1: the traditional video coding pipeline is re-used, but most or all the components are replaced with NNs. This is illustrated in FIG. 4.

Option 2: the whole pipeline is re-designed as follows:
Encoder NN: performs a non-linear transform
Quantization and lossless encoding of the encoder NN's output.
Lossless decoding and dequantization.
Decoder NN: performs a non-linear inverse transform.

Figure 5:
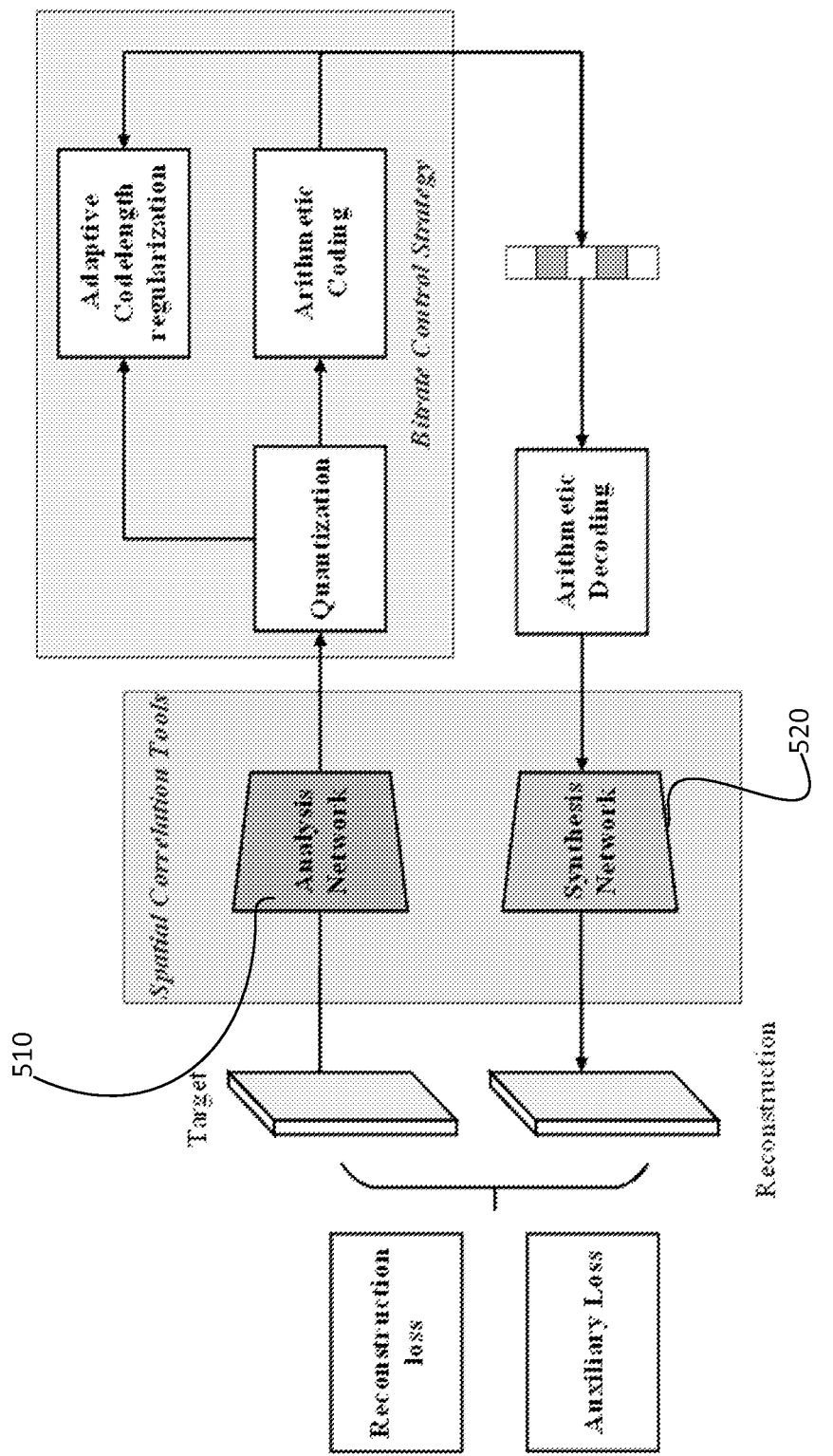
FIG. 5 shows an example of a neural network-based video coding pipeline.

The encoder and decoder NNs may be parts of a neural auto-encoder architecture. FIG. 5 illustrates an example, where the Analysis Network 510 is the Encoder NN, the Synthesis Network 520 is the Decoder NN.

In the Option 2, the input data is analyzed by the Encoder NN (Analysis Network) 510, which outputs a new representation of that input data. The new representation may be more compressible. This new representation may then be quantized to a discrete number of values. The quantized data is then lossless encoded, for example by an arithmetic encoder, thus obtaining a bitstream. On the decoding side, the bitstream is first lossless decoded, for example by using an arithmetic decoder. The lossless decoded data is dequantized and then input to the Decoder NN (Synthesis Network) 520. The output is the reconstructed or decoded data. In case of lossy compression, the lossy steps may comprise the Encoder NN and/or the quantization.

In order to train this system, a training objective function (also called "training loss") may be utilized, which may comprise one or more terms, or loss terms, or simply losses. In one example, the training loss comprises a reconstruction loss term and a rate loss term. The reconstruction loss encourages the system to decode data that is similar to the input data, according to some similarity metric. Examples of reconstruction losses are:

Mean squared error (MSE);

Multi-scale structural similarity (MS-SSIM);

Losses derived from the use of a pretrained neural network. For example, error(f1, f2), where f1 and f2 are the features extracted by a pretrained neural network for the input data and the decoded data, respectively, and error( ) is an error or distance function, such as L1 norm or L2 norm;

Losses derived from the use of a neural network that is trained simultaneously with the end-to-end learned codec. For example, adversarial loss can be used, which is the loss provided by a discriminator neural network that is trained adversarially with respect to the codec, following the settings proposed in the context of Generative Adversarial Networks (GANs) and their variants.

The rate loss encourages the system to compress the output of the encoding stage, such as the output of the arithmetic encoder. Term "compressing" refers to an operation of reducing the number of bits output by the encoding stage.

When an entropy-based lossless encoder is used, such as an arithmetic encoder, the rate loss may encourage the output of the Encoder NN to have low entropy. Example of rate losses are the following:

A differentiable estimate of the entropy.

A sparsification loss, i.e., a loss that encourages the output of the Encoder NN or the output of the quantization to have many zeros. Examples are L0 norm, L1 norm, L1 norm divided by L2 norm.

A cross-entropy loss applied to the output of a probability model, where the probability model may be a NN used to estimate the probability of the next symbol to be encoded by an arithmetic encoder.

One or more of reconstruction losses may be used, and one or more of the rate losses may be used, as a weighted sum. The different loss terms may be weighted using different weights, and these weights determine how the final system performs in terms of rate-distortion loss. For example, if more weight is given to the reconstruction losses with respect to the rate losses, the system may learn to compress less but to reconstruct with higher accuracy (as measured by a metric that correlates with the reconstruction losses). These weights are usually considered to be hyperparameters of the training session, and may be set manually by the person designing the training session, or automatically for example by grid search or by using additional neural networks.

Figure 6:
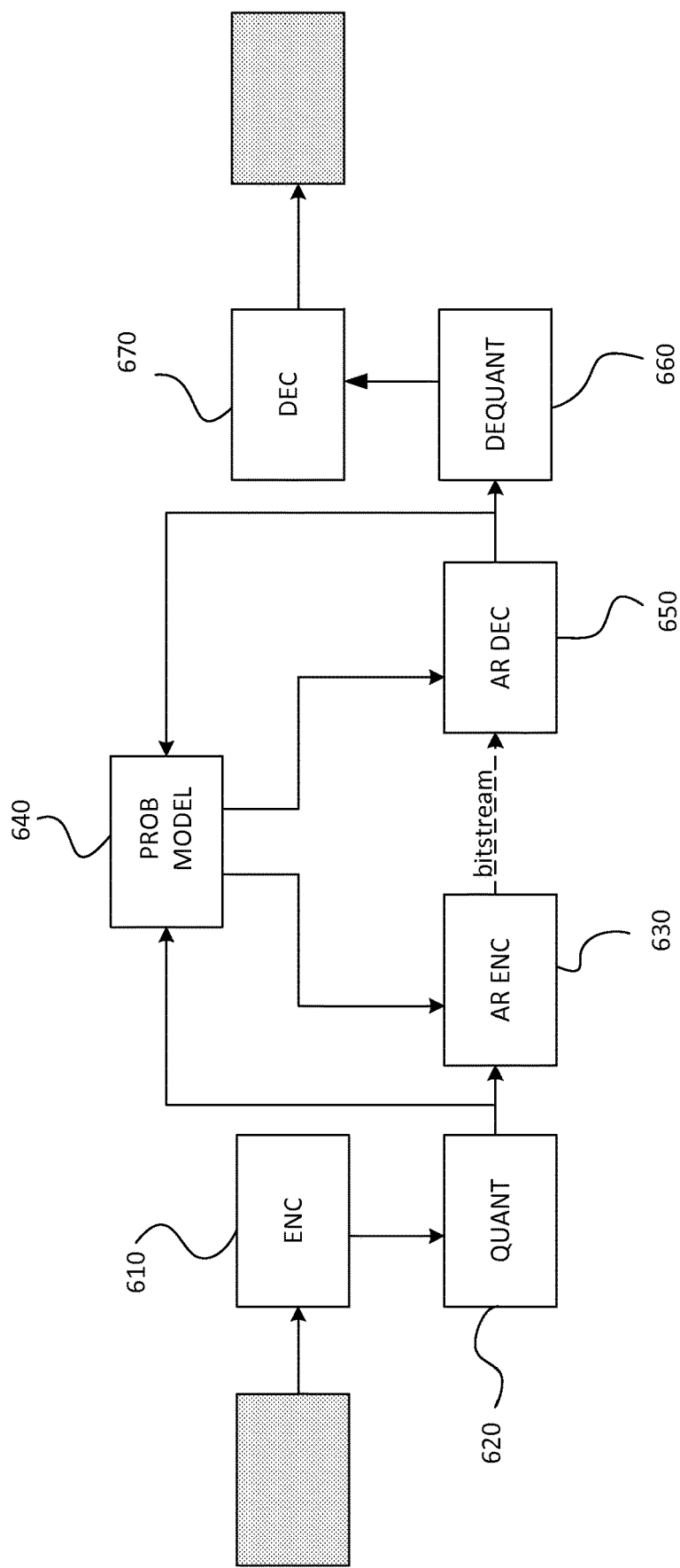
FIG. 6 shows an example of a neural network-based end-to-end learned video coding system.

As shown in FIG. 6, a neural network-based end-to-end learned video coding system may contain a neural encoder 610, a quantizer 620, a probability model 640, entropy codec (for example arithmetic encoder 630 and arithmetic decoder 650), dequantizer 660, and a neural decoder 670. The neural encoder 610 and neural decoder 670 may comprise neural network components. The probability model 640 may also comprise neural network components. Quantizer 620, dequantizer 660 and entropy codec 630, 650 may not be based on neural network components, but they may comprise neural network components, potentially.

On neural encoder side, the neural encoder 610 component takes a video as input and converts the video from its original signal space into a latent representation that may comprise a more compressible representation of the input. In the case of an input image, the latent representation may be a 3-dimensional tensor, where two dimensions represent the vertical and horizontal spatial dimensions, and the third dimension represent the "channels" which contain information at that specific location. If the input image is a 128× 128×3 RGB image (with horizontal size of 128 pixels, vertical size of 128 pixels, and 3 channels for the Red, Green, Blue color components), and if the neural encoder downsamples the input tensor by 2 and expands the channel dimension to 32 channels, then the latent representation is a tensor of dimensions (or "shape") 64×64×32 (i.e., with horizontal size of 64 elements, vertical size of 64 elements, and 32 channels). It is to be noted that the order of the different dimensions may differ depending on the convention which is used; in some cases, for the input image, the channel dimension may be the first dimension, so for the above example, the shape of the input tensor may be represented as 3×128×128, instead of 128×128×3. In the case of an input video (instead of just an input image), another dimension in the input tensor may be used to represent temporal information. The quantizer component 620 is configured to quantize the latent representation into discrete values given a predefined set of quantization levels. Probability model 640 and arithmetic codec component 630, 650 work together to perform lossless compression for the quantized latent representation and generate bitstreams to be sent to the decoder side. Given an element in the quantized latent representation to be encoded into the bitstream, the probability model 640 estimates the probability distribution of all possible values for that element based on a context that is constructed from available information at the current encoding/decoding state, such as the data that has already been encoded/decoded. Then, the arithmetic encoder 430 encodes the input symbols to bitstream using the estimated probability distributions.

On the neural decoder side, opposite operations are performed. The arithmetic decoder 650 and the probability model 640 first decode elements from the bitstream to recover the quantized latent representation. Then, the dequantizer 660 is configured to reconstruct the latent representation in continuous values and pass it to neural decoder 670 to recover the input video/image. It is to be noticed that the probability model 640 in this system is shared between the encoding and decoding systems. In practice, this means that a copy of the probability model 640 is used at neural encoder side, and another exact copy is used at neural decoder side.

In the system of FIG. 6, the neural encoder 610, probability model 640, and neural decoder 670 may be based on deep neural networks. The system may be trained in an end-to-end manner by minimizing the following rate-distortion loss function:

$$L = D + \lambda R,$$

where D is the distortion loss term, R is the rate loss term, and λ is the weight that controls the balance between the two losses. The distortion loss term may be the mean square error (MSE), structure similarity (SSIM) or other metrics that evaluate the quality of the reconstructed video. Multiple distortion losses may be used and integrated into D, such as a weighted sum of MSE and SSIM. The rate loss term is normally the estimated entropy of the quantized latent representation, which indicates the number of bits necessary to represent the encoded symbols, for example, bits-per-pixel (bpp).

For lossless video/image compression, the system may contain only the probability model 640 and arithmetic encoder 630/arithmetic decoder 650. The system loss function contains only the rate loss, since the distortion loss is always zero (i.e., no loss of information).

A quantized latent representation is a 3-dimensional (or 4-dimensional for video compression) tensor, where two dimensions represent spatial information, one dimension represents the channel information, and another dimension represents temporal information in the 4-dimension case. The channel dimension captures information about a specific location or region of an input image or video. In the rest of this specification, it is assumed that the quantized latent representation is a 3-dimension tensor. The idea is naturally applicable to other dimensions. A pixel in a quantized latent representation is the vector along the channel dimension at a spatial position. It is to be noticed that a pixel, here, does not refer to a picture element, i.e., an element of the picture or image or frame which is input to the encoder; instead, a pixel is referring to a vector within the quantized latent representation, where the quantized latent representation is the output of a quantization operation applied on the output of an encoder.

The probability model 640 in a NN-based video coding system is responsible for giving an estimation of the probability distribution of the quantized latent representation. The probability distribution can be defined using a parametric model, where the probability distribution function is explicitly determined by a certain number of parameters, or a non-parametric model, where a system is trained to approximate the probability distribution function. The probability distribution estimation is used by the arithmetic encoder/decoder 630, 650 to compress/decompress the quantized latent representation. To achieve a better estimation, a probability model 640 normally processes the pixels in the quantized latent representation in a certain order, for example, a raster scan order or an order defined in a multi-scale mode. The pixels that have already been processed are used as context to achieve a better estimation for other pixels. To further enrich the context information, the probability model 640 may also choose to process the channels of each pixel separately. The channels that have already been processed are used as context to help the estimation of other channels. If channel A uses channel B as its context, this means that A is dependent on B. When channels A and B are not dependent on each other, this means that channel A and B are independent, i.e., channel A does not use channel B as context, and channel B does not use channel A as context.

In principle, an abundant context with more information can yield a better estimation of the probability distribution. However, the channel dependency mode directly affects the encoding and decoding speed. Channels that are independent of each other can be processed in parallel, which can be efficiently computed using hardware that supports parallel computing. Channels that are dependent on another set of channels must be processed after the channels on which they depend. For certain setups, a sequential dependency mode does not affect the encoding speed since all elements to be processed are available on the encoder side. However, in all setups, the decoding speed is inevitably affected by the dependency mode, which is a more serious problem for those use-cases where decoding speed is more important than encoding speed. Thus, a proper dependency mode is critical for achieving a balance of processing speed and estimation accuracy.

The probability model 640 is a critical component for a video coding system. It is responsible for giving probability distribution estimation of the quantized latent representation. Achieving a fast encoding/decoding speed while retaining the accuracy of the estimation is a challenging task. A sequential channel dependency mode may achieve an accurate estimation; however, the slow decoding speed limits its usage. On the other hand, when all channels are independent of each other and processed in parallel, the system achieves a fast decoding performance by sacrificing the compression rate.

The present embodiments provide efficient channel dependency modes that can achieve fast decoding speed with good estimation accuracy.

The present embodiments provide flexible channel dependency modes that exploit the correlation between the channels to achieve a high compression performance while maintaining a fast decoding speed.

In addition, the present embodiments provide a software architecture where different channel dependency modes can be easily implemented without increasing the model size or changing the software architecture.

The present embodiments are discussed in more detailed manner in the following.

A probability model 640 is configured to estimate a probability distribution of the elements in a quantized latent representation, e.g. a 3D or 4D tensor. When the probability model 640 processes a pixel or a set of pixels of the quantized latent representation, it may process the channels of the pixel(s) in separate steps according to a predefined channel dependency mode. The channel dependency mode defines the dependency relationship of the channels, which determines the processing order of the channels. If channel A is dependent on channel B, channel B must be processed before channel A and can be used as a context to process channel A.

Channels that are independent of each other can be processed in parallel using hardware that supports parallel computing or efficient software implementations or combination of hardware and software implementations. This can significantly improve the processing speed. In the present embodiments, the probability model processes the quantized latent representation in steps. At each step, the channels that are independent of each other are processed in parallel.

According to one embodiment, a linear model or a non-linear model, including a nonlinear model implemented by a neural network, may be used to model the relationship between the dependent channels. For example, when the probability distribution is defined by a parametric model, $p_j = f(p_1, \ldots, p_k, v_1, \ldots, v_k)$, where $p_j$ is the estimated parameters for channel j, $p_1, \ldots, p_k$ are estimated parameters for channels that channel j is dependent on, $v_1, \ldots, v_k$ are values at channel 1 to k, and $f(\cdot)$ is a linear or nonlinear function. If the probability distribution is defined by a non-parametric model, $b_j = g(v_1, \ldots, v_k)$, where $b_j$ is the vector of the probability distribution function values of all possible input values, $v_1, \ldots, v_k$ are values at channel 1 to k that channel j is dependent on, and $g(\cdot)$ is a linear or nonlinear function.

According to another embodiment, a linear model or a nonlinear model, including a nonlinear model implemented by a neural network, may be used to generate context information. The generated context information is given as an extra context to a context-based model to derive the parameters of the probability distribution functions. For example, when the probability distribution function is defined by a parametric model, $c_j = f(p_1, \ldots, p_k, v_1, \ldots, v_k)$, $p_j = g(D_j, c_j)$, where $c_j$ is the generated context information using a linear or nonlinear function $f(\cdot)$, $p_1, \ldots, p_k$ are estimated parameters for channels that channel j is dependent on, $v_1, \ldots, v_k$ are values at channel 1 to k, $g(\cdot)$ is the context model to calculate the parameters for channel j, and $D_j$ is the other context information that the context model $g(\cdot)$ uses. When the probability distribution function is defined by a non-parametric model, $c_j = f(v_1, \ldots, v_k)$, $b_j = g(D_j, c_j)$, where $c_j$ is the generated context information using a linear or nonlinear function $f(\cdot)$, $v_i, \ldots, v_k$ are values at channel 1 to k that channel j is dependent on, $b_j$ is the vector of the probability distribution function values of all possible input values, $g(\cdot)$ is the context model to calculate $b_j$, $D_j$ is the other context information that the context model $g(\cdot)$ uses.

There are six channel dependency modes, also referred to as "grouping modes" that are discussed with respect to present embodiments.

Mode 1

In Mode 1, channels are split into two groups, one seed group S and one dependent group D. The channels in seed group S are in fully dependent mode, i.e., a channel is dependent on all previous channels. Let N be the number channels, and $S_i$ be channel i in seed group S, the dependency relationship can be expressed as $$S_i: S_{i-1}, S_{i-2}, \ldots S_1,$$

where symbol ":" represents that the left item(s) is (are) dependent on the right item(s), and $i=1, \ldots, N$. The channels in the dependent group D are independent of the channels in the same group, but depend on the channels in the seed group, i.e. $D_i:S$, where $D_i$ is channel i in dependent group D.

In order to achieve high processing speed, with this mode, the size of the seed group may be set to a smaller number compared to the total number of channels, for example, 2 or 4 channels in the seed group. To process the quantized latent representation, the system takes $|S|+1$ steps, where $|S|$ is the number of channels in the seed group. For example, when $N=128$ and $|S|=4$, the system processes the total channels in 5 steps, which is significantly faster than a fully dependent mode that takes 128 steps.

It is appreciated that the groups may have a different number of channels.

Mode 2

In Mode 2, channels are split into K groups. In each group, the channels are independent of each other. However, the channels in a group are dependent on all channels in the groups that have already been processed. The channel dependency can be expressed as $$G_i^{(j)}: G^{(j-1)}, \ldots, G^{(1)},$$

where $G_i^{(j)}$ is channel i in group j, $G^{(k)}$ represents all channels in group k, i=1, ..., $|G^{(j)}|$, $|G^{(j)}|$ is number of channels in group j, and j=1, ..., K.

With this mode, the system processes the quantized latent representation in K steps. In order to achieve high processing speed, K may be set to a much smaller number than N. For example, when N=128 total channels, K=4 groups, and each group has size $|G|$=32, only 4 steps need to be performed.

It is appreciated that channels can be evenly or unevenly split into K groups. In the latter case, the number of channels in each group can be different.

Mode 3

In Mode 3, channels are split into K groups. The first group is in fully dependent mode, i.e. each channel in the first group is dependent on the previous channels of this group. The channels in other groups are independent of the channels in the same group but depend on the channels in the groups that have already been processed. The channel dependency can be expressed as $$G_i^{(1)}: G_{i-1}^{(1)}, \ldots, G_1^{(1)}$$
$$G_i^{(j)}: G^{(j-1)}, \ldots, G^{(1)} \text{ for } j = 2, \ldots, K.$$

With this mode, the system processes the channels in $K-1+|G^{(1)}|$ steps, where $|G^{(1)}|$ is the number of channels in group 1. For example, if there are 4 groups and the first group has 4 channels, the system processes the total channels in 4−1+4=7 steps.

It is appreciated that the groups may have a different number of channels.

Mode 4

In Mode 4, channels are split into K groups. Inside each group, the channels are in fully dependent mode, i.e. a channel is dependent on the previous channels in the same group. The channels in a group are independent of any channels in other groups. The channel dependency can be expressed as $$G_i^{(j)}: G_{i-1}^{(j)}, \ldots G_1^{(j)},$$

where j=1, ..., K, i=1, ..., $|G^{(j)}|$, and $|G^{(j)}|$ is the number of channels in group j.

With this mode, the channels in different groups can be processed in parallel, whereas the channels in each group must be processed in sequential order. The system processes the channels in $\max(|G^{(1)}|, \ldots, |G^{(K)}|)$ steps. For example, if all groups have 4 channels, the channels can be processed in 4 steps.

It is appreciated that the groups may have a different number of channels.

Mode 5

In Mode 5, the channels are split into 2 groups. The channels in the first group are further split into $K_1$ subgroups, where inside each subgroup the channels are in fully dependent mode, i.e. a channel in a subgroup is dependent on all previous channels, and the channels in a subgroup is independent of any channel in other subgroups. The channels in the second group are further split into $K_2$ subgroups, where the channels in each subgroup are independent of the channels in the same subgroup but dependent on the channels in all previous subgroups and the subgroups in the first group. The system first processes the first group, then processes the second group.

Let $G^{(j)}$ be the subgroup j of the first group and $H^{(j)}$ be the subgroup j in the second group. The channel dependency can be expressed as $$G_i^{(j)}: G_{i-1}^{(j)}, \ldots, G_1^{(j)}$$
$$H_i^{(j)}: H^{(j-1)}, \ldots H^{(1)}, G^{(K_1)}, \ldots G^{(1)},$$

It is appreciated that the subgroups may have a different number of channels.

Mode 6 Mode 6 is an extension of Mode 5. In Mode 6, the channels are split into 2 groups. The channels in the first group are further split into $K_1$ subgroups, where inside each subgroup the channels are in fully dependent mode, i.e. a channel in a subgroup is dependent on all previous channels, and the channels in a subgroup are independent of any channel in other subgroups. The channels in the second group are further split into $K_2$ sub groups, where the channels in each subgroup are fully dependent on the channels in the same subgroup and the channels in the first group, but independent of the channels in the other subgroups of the second group. The system first processes the first group, then processes the second group.

Let $G^{(j)}$ be the subgroup j of the first group and $H^{(j)}$ be the subgroup j in the second group. The channel dependency can be expressed as $$G_i^{(j)}: G_{i-1}^{(j)}, \ldots, G_1^{(j)}$$
$$H_i^{(j)}: H_{i-1}^{(j)}, \ldots H_1^{(j)}, G^{(K_1)}, \ldots G^{(1)},$$

It is appreciated that the subgroups may have a different number of channels.

The channel grouping for dependency modes 1 to 6 may be determined via a learning approach. According to an embodiment, the channel grouping may be learned via an attention mechanism. The encoder is first pre-trained using a training dataset. The importance of each channel of the quantized latent representation is determined in an unsupervised manner, for example, by measuring the excitation (e.g. using absolute activation values) of neurons using a set of evaluation data samples. The channel groups are then derived from the histogram of n bins from the channel importance map.

According to an alternative implementation a vector-quantization or clustering may be employed on top of the relevant activations of the channels in order to group them together using some validation data.

According to another embodiment, the channel grouping may be derived from the correlation matrix of the channels. The encoder may be first pre-trained using a training dataset. The correlation matrix of the channels of the quantized latent representation is calculated using a set of evaluation data samples. Channel groups are determined by 20-clustering the correlation matrix.

According to another embodiment, a loss term can be added to promote grouping of channels, example of such loss terms is common in deep clustering. That is a linear of combination of the task loss, e.g., the visual reconstruction loss with the clustering loss, e.g. k-means cluster distances.

According to another embodiment, it could be that the grouping happens via random projection techniques. That is, the activations of the channels or some features describing them, are projected into a lower dimension space to determine the main groups.

According to another embodiment, when clustering or random projection is used, the number of groups could be determined using spectral graph analysis. That is the adjacency of channels is determined and a Laplacian matrix is derived for which the eigen values are determined and the eigen values are used to redefine the input space and determine the optimal number of clusters. This analysis could apply to any clustering approach.

Figure 7:
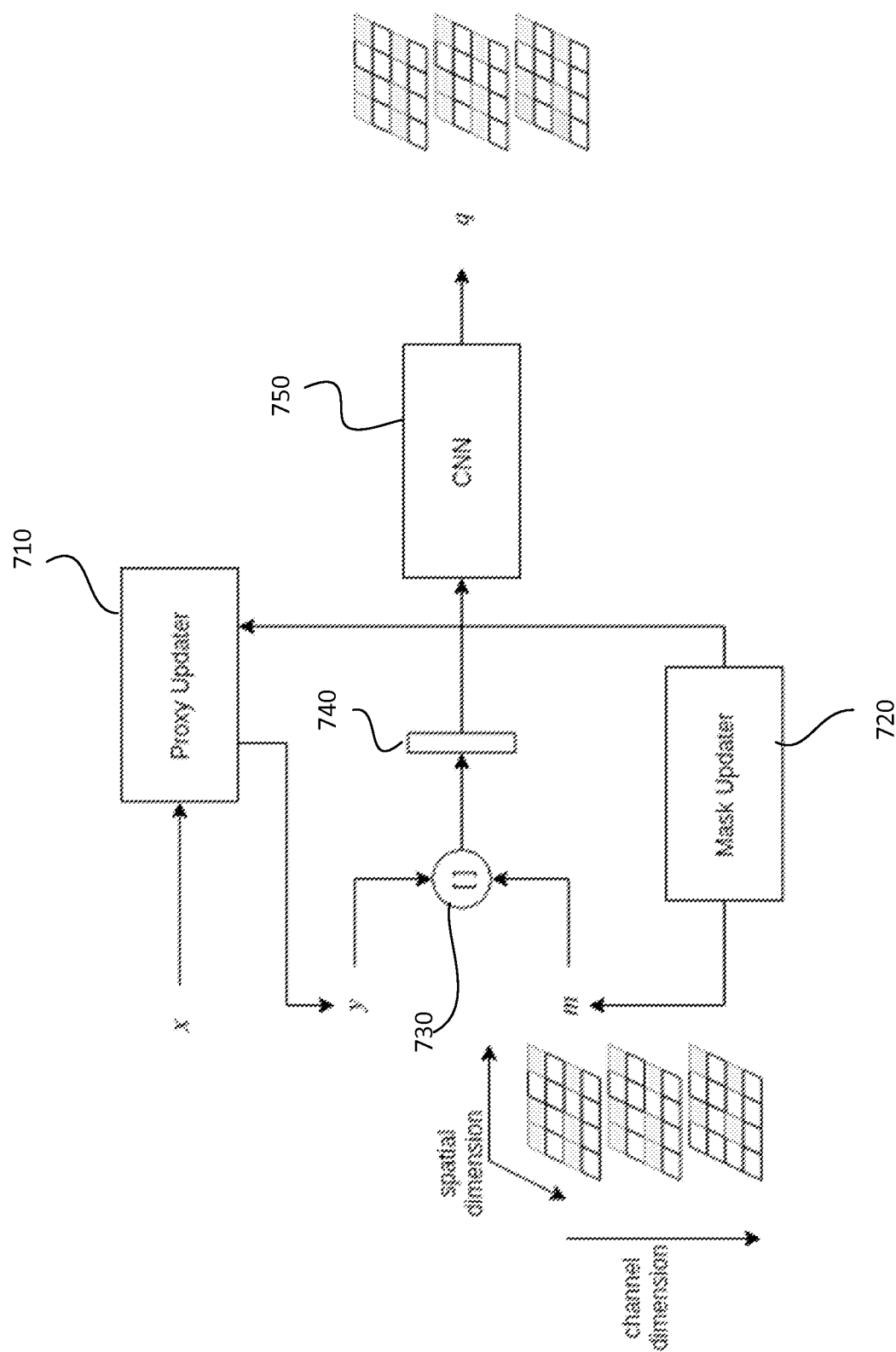
FIG. 7 shows an example of a probability model using mask and proxy mechanism.

FIG. 7 illustrates a probability model in more detailed manner. In FIG. 7, the probability model uses mask and proxy mechanisms 710, 720.

The probability model uses a deep neural network 750 to derive the parameters q of the probability distribution function for the elements in the quantized latent representation. The input of the probability model is different at the training, encoding, and decoding stages. At the training and encoding stage, the input x is the quantized latent representation provided by the quantizer. At decoding state, the input x is output from the arithmetic decoder which is the elements of the quantized latent representation decoded from the bitstream. The probability model uses a proxy tensor y and a mask tensor m to store the state of the encoding and decoding status. The proxy tensor y is a tensor with the same dimension as the quantized latent representation x and holds the predicted and true values of the elements in the quantized latent representation x. The elements of the mask tensor m have binary values of either 0 or 1, where value 1 indicates that the corresponding elements in the proxy tensor hold true values of the quantized latent representation. The proxy tensor y and the mask tensor m are first concatenated 730, then, transformed to an intermediate tensor by a convolution operator 740. The intermediate tensor is then processed by a deep convolutional neural network 750 to generate the parameters p for the probability distribution function of the elements in the quantized latent representation. At the training stage, the estimated probability distribution is used to calculate the required bits to compress the corresponding elements of the quantized latent representation.

At the encoding stage, the estimated probability distribution is used by the arithmetic encoder to encode the corresponding elements in the quantized latent representation into a bitstream. At the decoding stage, the estimated probability distribution is used by the arithmetic decoder to decode the corresponding elements in the quantized latent representation from the bitstream.

The system processes the quantized latent representation x in multiple steps according to the defined channel dependency mode. At each step, the mask updater component 720 updates the mask tensor m according to the defined channel dependency mode. And the proxy updater component 710 updates the proxy tensor y with the true values of the elements in the quantized latent representation x.

At the encoding stage, the proxy tensor y may be first filled with predicted values, which may be derived from other context information. This generates a mixed representation comprising predicted values and true values existing in the quantized latent representation. The mask tensor m indicates which elements in the mixed representation are with true values, and the mask updater component 720 defines the position of the elements to be processed according to the defined channel dependency mode. Then the probability model is configured to calculate the parameters p of the probability distribution function of the corresponding elements in the mixed representation. Next, the elements to be processed in the quantized latent representation x and the estimated probability distribution functions for these elements are given to the arithmetic encoder (FIG. 6: 630) to encode these elements into a bitstream. Next, the corresponding elements in the proxy tensor y may be updated by the proxy updater 710 with the true values from the input quantized latent representation x. Then, the input mask tensor m is updated by the mask updater 720 according to the defined channel dependency mode. This procedure repeats until all elements of the quantized latent representation x are processed.

At the decoding stage, the input latent representation x is may be first filled with predicted values. Then the mask updater 720 gives the positions of the elements to be processed according to the defined channel dependency mode. Next, the probability model calculates the parameters p of the probability distribution functions for the elements to be processed. The estimated probability distribution functions are then used by the arithmetic decoder (FIG. 6: 650) to decode the corresponding elements from the input bitstream. Next, the decoded elements are set to the corresponding positions of the proxy tensor y by the proxy updater 710. Next, the input mask is updated accordingly by the mask updater 720. This procedure is repeated until all elements in the quantized latent representation x are decoded.

Figure 8:
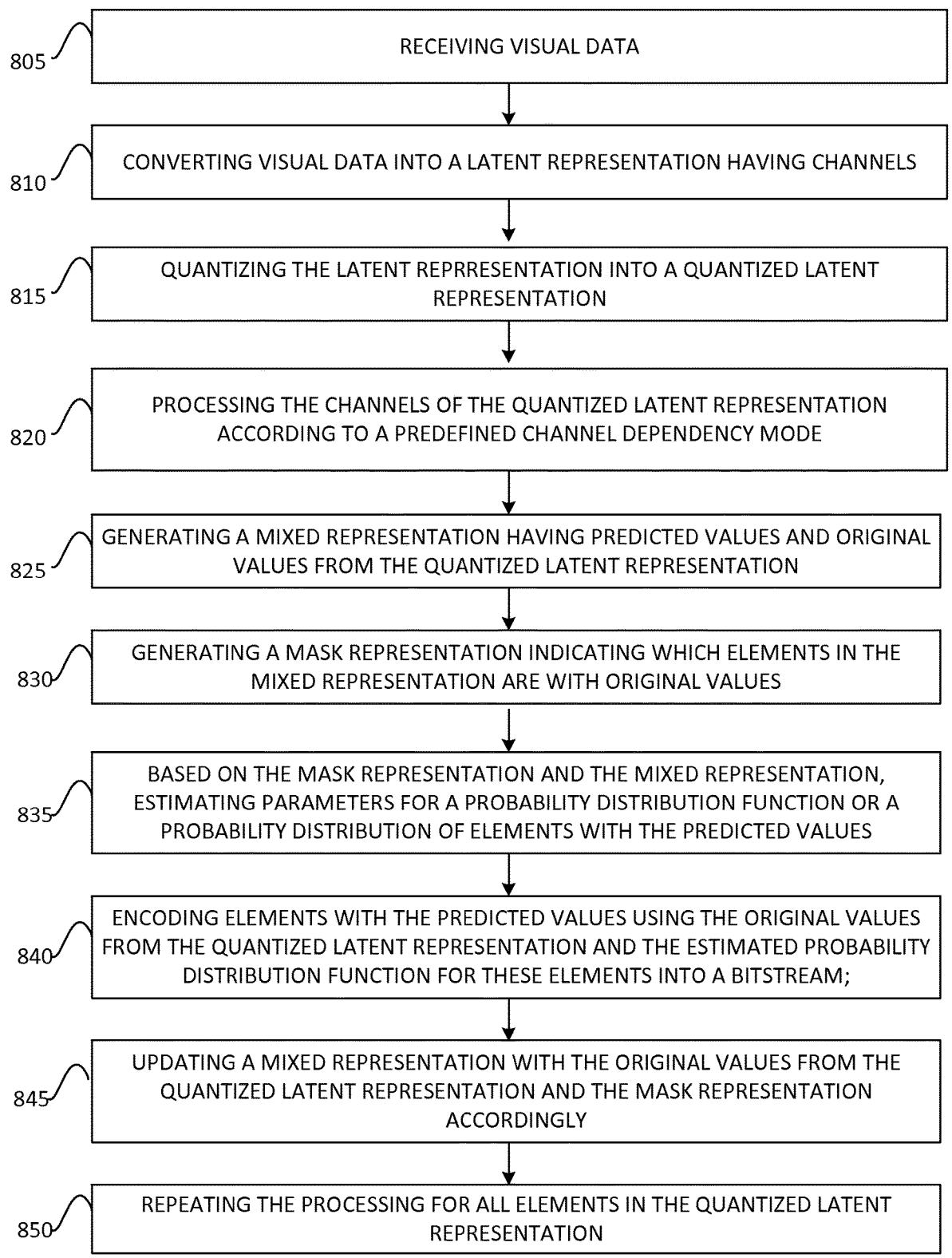
FIG. 8 is a flowchart illustrating a method for encoding according to an embodiment.

The method for encoding according to an embodiment is shown in FIG. 8. The method generally comprises receiving 805 visual data; converting 810 the visual data into a latent representation comprising channels; quantizing 815 the latent representation into a quantized latent if required; processing 820 the channels of the quantized latent representation according to a predefined channel dependency mode by generating 825 a mixed representation comprising predicted values and original values from the quantized latent representation; generating 830 a mask representation indicating which elements in the mixed representation are with original values; based on the mask representation and the mixed representation, estimating 835 parameters for a probability distribution function or a probability distribution of elements with the predicted values; encoding 840 elements with the predicted values using the original values from the quantized latent representation and the estimated probability distribution function for these elements into a bitstream; updating 845 a mixed representation with the original values from the quantized latent representation and the mask representation accordingly; and repeating 850 the processing for all elements in the quantized latent representation. Each of the steps can be implemented by a respective module of a computer system.

An apparatus according to an embodiment comprises means for receiving visual data; means for converting the visual data into a latent representation comprising channels; means for quantizing the latent representation into a quantized latent representation if required; means for processing the channels of the quantized latent representation according to a predefined channel dependency mode by generating a mixed representation comprising predicted values and original values from the quantized latent representation; generating a mask representation indicating which elements in the mixed representation are with original values; based on the mask representation and the mixed representation, estimating parameters for a probability distribution function or a probability distribution of elements with the predicted values; encoding elements with the predicted values using original values from the quantized latent representation and the estimated probability distribution function for these elements into a bitstream; updating a mixed representation with the original values from the quantized latent representation and the mask representation accordingly; repeating the processing for all elements in the quantized latent representation. The means comprises at least one processor, and a memory including a computer program code, wherein the processor may further comprise processor circuitry. The memory and the computer program code are configured to, with the at least one processor, cause the apparatus to perform the method of FIG. 8 according to various embodiments.

Figure 9:
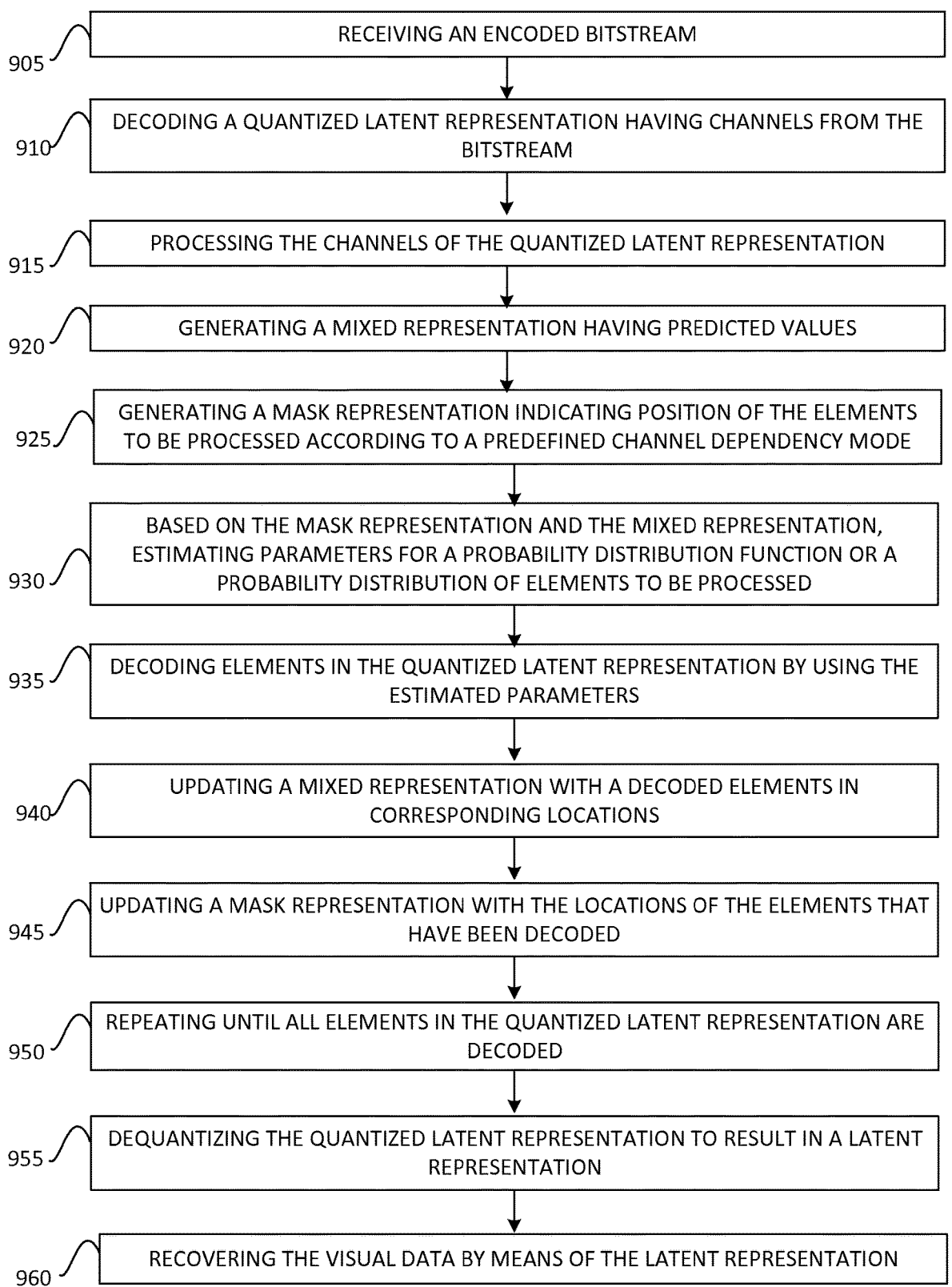
FIG. 9 is a flowchart illustrating a method for decoding according to an embodiment.

The method for decoding according to an embodiment is shown in FIG. 9. The method generally comprises receiving 905 an encoded bitstream; decoding 910 a quantized latent representation comprising channels from the bitstream; processing 915 the channels of the quantized latent representation by generating a mixed representation comprising predicted values; generating 920 a mask representation indicating position of the elements to be processed according to a predefined channel dependency mode; based on the mask representation and the mixed representation, estimating 930 parameters for a probability distribution function or a probability distribution of elements to be processed; decoding 935 elements in the quantized latent representation by using the estimated parameters; updating 940 a mixed representation with a decoded elements in corresponding locations; updating 945 a mask representation with the locations of the elements that have been decoded; repeating 950 until all elements in the quantized latent representation are decoded; dequantizing 955 the quantized latent representation to result in a latent representation; and recovering 960 the visual data by means of the latent representation.

An apparatus according to an embodiment comprises means for receiving an encoded bitstream; means for decoding a quantized latent representation comprising channels from the bitstream; means for processing the channels of the quantized latent representation by generating a mixed representation comprising predicted values; generating a mask representation indicating position of the elements to be processed according to a predefined channel dependency mode; based on the mask representation and the mixed representation, means for estimating parameters for a probability distribution function or a probability distribution of elements to be processed; means for decoding elements in the quantized latent representation by using the estimated parameters; means for updating a mixed representation with a decoded elements in corresponding locations; means for updating a mask representation with the locations of the elements that have been decoded; means for repeating until all elements in the quantized latent representation are decoded; means for dequantizing the quantized latent representation to result in a latent representation; means for recovering the visual data by means of the latent representation. The means comprises at least one processor, and a memory including a computer program code, wherein the processor may further comprise processor circuitry. The memory and the computer program code are configured to, with the at least one processor, cause the apparatus to perform the method of FIG. 9 according to various embodiments.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising: at least one processor; and at least one non-transitory memory including computer program code; wherein the at least one non-transitory memory and the computer program code are configured to, with the at least one processor, cause the apparatus at least to perform:
   receiving a visual data;
   converting the visual data into a latent representation comprising channels; quantizing the latent representation into a quantized latent representation when required;
   processing the channels of the quantized latent representation according to a predefined channel dependency mode by:
      generating a mixed representation comprising predicted values and original values from the quantized latent representation;
      generating a mask representation indicating which elements in the mixed representation are with the original values;

based on the mask representation and the mixed representation, estimating parameters for a probability distribution function or a probability distribution of elements with the predicted values;
encoding elements with the predicted values using the original values from the quantized latent representation and the estimated probability distribution function for the encoded elements into a bitstream;
updating a mixed representation with the original values from the quantized latent representation and the mask representation accordingly; and
repeating the processing for all elements in the quantized latent representation.

2. The apparatus according to claim 1, wherein the apparatus is further caused to perform: concatenating the mixed representation and the mask representation to result in a concatenated representation.

3. The apparatus according to claim 2, wherein the apparatus is further caused to perform: transforming the concatenated representation into an intermediate representation.

4. The apparatus according to claim 3, wherein the parameters are estimated by processing the intermediate representation in a neural network.

5. The apparatus according to claim 1, wherein the quantized latent representation is a three-dimensional tensor or four-dimensional tensor.

6. The apparatus according to claim 1, wherein according to a first predefined channel dependency mode, the apparatus is further caused to perform: splitting channels into two groups, wherein a first group comprises channels being dependent on all previous channels, and wherein a second group comprises channels that are independent of the channels in the second group, but depend on the channels in the first group.

7. The apparatus according to claim 1, wherein according to a second predefined channel dependency mode, the apparatus is further caused to perform: splitting channels into a plurality of groups, wherein channels in each group are independent of each other, but dependent on all channels in groups that have already been processed.

8. The apparatus according to claim 1, wherein according to a third predefined channel dependency mode, the apparatus is further caused to perform: splitting channels into a plurality of groups, where each channel in a first group is dependent on previous channels of the first group, and wherein channels in groups other than the first group are independent of the channels in the same group, and depend on the channels in the groups that have been processed.

9. The apparatus according to claim 1, wherein according to a fourth predefined channel dependency mode, the apparatus is further caused to perform: splitting channels into a plurality of groups, wherein channels in each group are dependent on previous channels in the same group, and wherein channels in a group are independent of any channels in other groups.

10. The apparatus according to claim 1, wherein according to a fifth predefined channel dependency mode, the apparatus is further caused to perform: splitting channels into first and second groups, wherein channels in the first group are split into a plurality of subgroups comprising channels being dependent on all previous channels and independent of any channel in other subgroups; wherein channels in the second group are split into a plurality of subgroups comprising channels being independent of channels in the same subgroup and are dependent on the channels in previous subgroups and subgroups of the first group.

11. The apparatus according to claim 1, wherein according to a sixth predefined channel dependency mode, the apparatus is further caused to perform: splitting channels into first and second groups, wherein channels in the first group are split into a plurality of subgroups comprising channels being dependent on all previous channels, and being independent of any channel in other subgroups; wherein channels in the second group are split into a plurality of subgroups comprising channels being dependent on the channels in the same subgroup and the channels in the first group, and are independent of the channels in the other subgroups of the second group.

12. A method comprising: receiving visual data; converting the visual data into a latent representation comprising channels; quantizing the latent representation into a quantized latent representation when required; processing the channels of the quantized latent representation according to a predefined channel dependency mode by:
generating a mixed representation comprising predicted values and original values from the quantized latent representation;
generating a mask representation indicating which elements in the mixed representation are with the original values;
based on the mask representation and the mixed representation, estimating parameters for a probability distribution function or a probability distribution of elements with the predicted values;
encoding elements with the predicted values using the original values from the quantized latent representation and the estimated probability distribution function for the encoded elements into a bitstream;
updating a mixed representation with the original values from the quantized latent representation and the mask representation accordingly; and
repeating the processing for all elements in the quantized latent representation.

13. The method according to claim 12 further comprising: concatenating the mixed representation and the mask representation to result in a concatenated representation.

14. The method according to claim 13 further comprising: transforming the concatenated representation into an intermediate representation.

15. The method according to claim 14, wherein the parameters are estimated by processing the intermediate representation in a neural network.

16. The method according to claim 12, wherein the quantized latent representation is a three-dimensional tensor or four-dimensional tensor.

17. The method according to claim 12, wherein according to a first predefined channel dependency mode, the method further comprising: splitting channels into two groups, wherein a first group comprises channels being dependent on all previous channels, and wherein a second group comprises channels that are independent of the channels in the second group, but depend on the channels in the first group.

18. The method according to claim 12, wherein according to a second predefined channel dependency mode, the method further comprising: splitting channels into a plurality of groups, wherein channels in each group are independent of each other, but dependent on all channels in groups that have already been processed.

19. An apparatus comprising: at least one processor; and at least one non-transitory memory including computer program code; wherein the at least one memory and the computer program code are configured to, with the at least one processor, cause the apparatus at least to perform: receiving an encoded bitstream; decoding a quantized latent representation comprising channels from the encoded bitstream; processing the channels of the quantized latent representation by:
- generating a mixed representation comprising predicted values;
- generating a mask representation indicating position of the elements to be processed according to a predefined channel grouping for dependency mode;
- based on the mask representation and the mixed representation, estimating parameters for a probability distribution function or a probability distribution of elements to be processed; decoding elements in the quantized latent representation by using the estimated parameters; updating a mixed representation with decoded elements in corresponding locations;
- updating the mask representation with the locations of the elements that have been decoded; and
- repeating until all elements in the quantized latent representation are decoded;
- dequantizing the quantized latent representation to result in a latent representation; and
- recovering a visual data by means of the latent representation.

20. A method comprising: receiving an encoded bitstream; decoding a quantized latent representation comprising channels from the encoded bitstream; processing the channels of the quantized latent representation by:
- generating a mixed representation comprising predicted values;
- generating a mask representation indicating position of the elements to be processed according to a predefined channel grouping for dependency mode;
- based on the mask representation and the mixed representation, estimating parameters for a probability distribution function or a probability distribution of elements to be processed; decoding elements in the quantized latent representation by using the estimated parameters;
- updating a mixed representation with decoded elements in corresponding locations;
- updating the mask representation with the locations of the elements that have been decoded;
- repeating until all elements in the quantized latent representation are decoded;
- dequantizing the quantized latent representation to result in a latent representation; and
- recovering a visual data by means of the latent representation.

* * * * *